United States Patent [19]

Goorjian

[11] Patent Number: 5,963,683
[45] Date of Patent: *Oct. 5, 1999

[54] PHOTONIC SWITCHING DEVICES USING LIGHT BULLETS

[75] Inventor: Peter M. Goorjian, Oakland, Calif.

[73] Assignee: The United States of America as Represented by the Administrator of the National Aeronautics and Space Administration, Washington, D.C.

[ * ] Notice: This patent is subject to a terminal disclaimer.

[21] Appl. No.: 08/845,733

[22] Filed: Apr. 25, 1997

Related U.S. Application Data

[63] Continuation-in-part of application No. 08/528,621, Aug. 25, 1995, Pat. No. 5,651,079.
[51] Int. Cl.$^6$ ....................................................... G02B 6/35
[52] U.S. Cl. .............................. 385/16; 385/122; 385/129
[58] Field of Search ........................... 385/15–18, 20–24, 385/27, 39, 122, 129, 130

[56] References Cited

U.S. PATENT DOCUMENTS

| | | | |
|---|---|---|---|
| 4,856,860 | 8/1989 | Silberberg et al. | 385/122 |
| 4,881,790 | 11/1989 | Mollenauer | 385/15 X |
| 5,297,224 | 3/1994 | Shaw | 385/12 |
| 5,377,284 | 12/1994 | Bullow | 385/11 |
| 5,442,720 | 8/1995 | Shaw | 385/16 |
| 5,651,079 | 7/1997 | Goorjian | 385/16 |

OTHER PUBLICATIONS

Friberg, S. R., Weiner, A. M., Silberberg, Y., Sfiz, B. G., and Smith, P. W., "Femtosecond switching in a dual–core–fiber nonlinear coupler", Optics Letters, vol. 13, No. 10, pp. 904–906, Oct., 1988.
Bell, T. E., Light that acts like 'natural bits', IEEE Spectrum, pp. 56–57, Aug. 1990.
Silberberg, Y., "Collapse of optical pulses", Optics Letters, vol. 22, pp. 1282–1284, Nov. 15, 1990.
Goorjian, P. M. and Silberberg, Y. "Numerical simulations of light bullets, using the full vector, time dependent Maxwell equations," Nonlinear Optics Topical Meeting, IEEE/Lasers and Electro–Optics Society and Optical Society of America, Waikoloa, Hawaii, Jul. 24–29, 1994, 3 pp.

(List continued on next page.)

*Primary Examiner*—John D. Lee
*Attorney, Agent, or Firm*—Kenneth L. Warsh; Harry Lupuloff; John G. Mannix

[57] ABSTRACT

A unique ultra-fast, all-optical switching device or switch is made with readily available, relatively inexpensive, highly nonlinear optical materials, which includes highly nonlinear optical glasses, semiconductor crystals and/or multiple quantum well semiconductor materials. At the specified wavelengths, these optical materials have a sufficiently negative group velocity dispersion and high nonlinear index of refraction to support stable light bullets. The light bullets counter-propagate through, and interact within the waveguide to selectively change each others' directions of propagation into predetermined channels. In one embodiment, the switch utilizes a rectangularly planar slab waveguide, and further includes two central channels and a plurality of lateral channels for guiding the light bullets into and out of the waveguide. An advantage of the present all-optical switching device lies in its practical use of light bullets, thus preventing the degeneration of the pulses due to dispersion and diffraction at the front and back of the pulses. Another advantage of the switching device is the relative insensitivity of the collision process to the time difference in which the counter-propagating pulses enter the waveguide, since, contrary to conventional co-propagating spatial solitons, the relative phase of the colliding pulses does not affect the interaction of these pulses. Yet another feature of the present all-optical switching device is the selection of the light pulse parameters which enables the generation of light bullets in nonlinear optical materials, including highly nonlinear optical glasses and semiconductor materials such as semiconductor crystals and/or multiple quantum well semiconductor materials.

33 Claims, 10 Drawing Sheets

OTHER PUBLICATIONS

Goorjian, P. M. and Silberberg, Y., "Numerical simulation of light bullets, using the full vector, time dependent Maxwell equations," Integrated Photonics Topical Meeting, cosponsored by the Optical Society of America and IEEE/Lasers and Electro–Optics Soc., Dana Point, CA, Feb. 23–25, 1995, 3 pp.

Aitchison, J. S., Weiner, A. M., Silberberg, Y., Oliver, M. K., Jackel, J. L., Leaird, D. E., Vogel, E. M., and Smith, P. W. E., "Observation of spatial optical solitons in a nonlinear planar waveguide," Optics Letters, vol. 15, No. 9, pp. 471–473, May 1, 1990.

Aitchison, J. S., Silberberg, Y., Weiner, A. M., Leaird, D. E., Oliver, M. K., Jackel, J. L., Vogel, E. M., and Smith, P. W. E., "Spatial optical solitons in planar glass waveguides," Journal Optical Society of America B, vol. 8, No. 6, pp. 1290–1297, Jun. 1991.

Borrelli, N. F., Aitken, B. G., and Newhouse, M. A., "Resonant and non–resonant effects in photonic glasses," Journal of Non–Crystalline Solids, pp. 109–122, vol. 185, (1995), [No Month].

Saleh, B. E. A., and Teich, M. C.: Fundamentals of Photonics, John Wiley, 1991, pp. 175, 550, 575.

Pankove, J. I.: Optical Processes in Semiconductors, Prentice–Hall, Inc., N. J., (1971), p. 98.

Grey, D. E.: American Institute of Physics Handbook, 3rd Ed., McGraw–Hill, New York (1972), pp. 6–60.

Driscoll, W. G., and Vaughan, W.: Handbook of Optics, sponsored by the Optical Society of America, McGraw–Hill, New York (1978), pp. 7–26 through 7–30, 7–32, 7–49.

Weber, M. J.: CRC Handbook of Laser Science and Technology, vol. III, Optical Materials, Part 1: Nonlinear Optical Properties and Radiation Damage, CRC Press, Inc., (1986), pp. 102–106, 121, 202, 203, 273–275.

Sheik–Bahae, M., Hutchings, D. C., Hagen, D. J., and Van Stryland, E., W.: "Dispersion of Bound Electronic Nonlinear Refraction in Solids," IEEE Journal of Quantum Electronics, vol. 27, No. 6, Jun. 1991, pp.1296–1309.

Bass, M., Van Stryland, E. W., Williams, D. R., and Wolfe, W. L.: Handbook of Optics, vol. II, Devices, Measurements, and Properties, 2nd Ed., sponsored by the Optical Society of America, McGraw–Hill, New York (1995), pp. 33.61–33.68.

Sirtori, C., Capasso, F., and Cho, A. Y.: "New Class of Coupled–Quantum–Well Semiconductors with Large Electric Field–Tunable Nonlinear Susceptibilities in the Infrared," in Physical Concepts and Materials for Novel Optoelectronic Device Applications II, F. Beltram and E. Gornik, Eds., Proc. SPIE 1985, pp. 158–169, (1993), (May).

Sirtori, C., Capasso, F., Sivco, D. L., and Cho, A. Y.: "Giant, Triply Resonant, Third–Order Nonlinear Susceptibility in Coupled Quantum Wells," Physical Review Letters, vol. 68, No. 7, Feb. 17, 1992, pp. 1010–1013.

Gravé, I., Segev, M., and Yariv, A.: "Observation of Phase Conjugation at 10.6 Microns Via Intersubband Third–Order Nonlinearities in a GaAs/AlGaAs Multi–Quantum–Well Structure," Appl. Phys. Lett., vol. 60, No. 22, Jun. 1, 1992, pp. 2717–2719.

Han, K. Y., Chen, C. W., Quigley, J. H., Hafich, M., Robinson, G. Y., Chang, R., and Lile, D. L.: "InP/InGaAs Based Charge–Coupled Devices for MQW Spatial Light Modulator Applications," First International Conference on Indium Phosphide and Related Materials for Advanced Electronic and Optical Devices, R. Singh, L. J. Messick, Eds., Proc. SPIE 1144, pp. 398–413, at 398, 399 (1989), (Mar.).

Madelung, Otfried, (Editor): Semiconductors–Basic Data, 2nd revised Edition, Springer, 1996, pp. 86, 101, 122.

PCT International Search Report, PCT Application Serial No. PCT/US96/13473,. (Jan. 1997).

PHOTONIC SWITCHING DEVICES USING LIGHT BULLETS

CROSS-REFERENCE TO RELATED APPLICATIONS

This is a continuation-in-part application of U.S. patent application Ser. No. 08/528,621, filed on Aug. 25, 1995, and titled "Photonic Switching Devices Using Light Bullets" (now U.S. Pat. No. 5,651,079).

This application is related to PCT patent application Ser. No. PCT/US96/13473, filed on Aug. 23, 1996.

ORIGIN OF INVENTION

The invention described herein was made by an employee of the United States Government and may be manufactured and used by or for the Government for governmental purposes without payment of any royalties thereon or therefor.

BACKGROUND OF THE INVENTION

1. Technical Field of the Invention

The present invention is generally directed to photonic switching devices, and it particularly relates to ultra-fast all-optical switching devices using light bullets as optical pulses and made of nonlinear optical materials, including highly nonlinear optical glasses, semiconductor crystals and/or multiple quantum well semiconductor materials. More specifically, the present invention relates to an all-optical switching process in a planar slab waveguide.

2. Description of the Prior Art

When a pulse of light travels in a linear dispersive medium its length increases due to group-velocity dispersion. Depending on the intensity of the pulse and the material properties of the medium, nonlinear effects on the pulse shape, called self-phase modulation, can also be significant. Nonlinear effects are characterized by a nonlinear relationship between the polarization density and the electric field; an example is the Kerr effect. The interplay between self-phase modulation and group-velocity dispersion can therefore result in an overall pulse spreading or pulse compression, depending on the magnitudes and signs of these two effects.

Under certain conditions, an optical pulse of prescribed shape and intensity can travel in a nonlinear dispersive medium without altering its shape, as if it were traveling in an ideal linear non dispersive medium. This occurs when the group-velocity dispersion fully compensates for the effect of self-phase modulation. Such pulse-like stationary waves are called solitary waves. Optical solitons are special solitary waves that are orthogonal, in the sense that when two of these waves cross one another in the medium, their intensity profiles are not altered, and only phase shifts are imparted as a result of the interaction, so that each wave continues to travel as an independent entity.

At a certain level of intensity and for certain pulse profiles, the effects of self-phase modulation and group-velocity dispersion are balanced so that a stable pulse, the soliton, travels without spread. The mathematical analysis of this phenomenon has so far been based on approximate solutions of Maxwell's nonlinear wave equations.

As used herein, the term soliton refers to generic solutions describing pulses that propagate without substantial change, and may be temporal or spatial. Spatial solitons are monochromatic, self-guided beams that are localized spatially in the transverse plane. They travel in a nonlinear medium without altering their spatial distribution, as a result of the balance between diffraction and self-phase modulation. Spatial solitons are the transverse analogs of temporal or longitudinal solitons.

Optical pulses including solitons, may be used for photonic switching and computing. Switching is an essential operation in communication networks. It is also a basic operation in digital computers and signal processing systems. The current rapid development of high-data-rate fiber-optic communications systems has created a need for high capacity repeaters and terminal systems for processing optical signals, and therefore, a need for high-speed photonic switches. Similarly, the potential for optical computing can optimally be realized if large arrays of fast photonic gates, switches, and memory elements are developed.

As used herein, a switch is a device that establishes and releases connections among transmission paths, such as in communication or signal-processing systems. A control unit processes the commands for connections and sends a control signal to operate the switch in the desired manner.

A switch is generally characterized by the following parameters:

Size: number of input and output lines.
Directions: whether data can be transferred in one or more directions.
Switching time: time necessary for the switch to be reconfigured from one state to another.
Propagation delay time: time taken by the signal to cross the switch.
Throughput: maximum data rate that can how through the switch when it is connected.
Switching energy: energy needed to activate and deactivate the switch.
Power dissipation: energy dissipated per second in the process of switching.
Insertion loss: drop in the signal power introduced by the connection.
Crosstalk: undesired power leakage to other lines.

Optical signals may be switched by the use of electrical, acoustic, and magnetic switches. For instance, in electro-optic switches, the optical signals are converted into electrical signals using photodetectors, switched electronically, and then converted back into light using LEDs or lasers. These optical/electrical conversions introduce unnecessary time delays and power loss, in addition to the loss of the optical phase caused by the process of detection. Therefore, direct optical switching is clearly preferable to non optical switching.

In an all-optical (or opto-optic) switch, light controls light with the help of a nonlinear optical material. Nonlinear optical effects may be direct or indirect, and may be used to make all-optical switching devices. All-optical switching devices have the capability of switching at much higher rates than non optical switching devices. Exemplary all-optical switching devices are described in Friberg, S. R., Weiner, A. M., Silberberg, Y., Sfiz, B. G., and Smith, P. W., "Femtosecond switching in a dual-core-fiber nonlinear coupler", Optics Letters, Vol. 13, No. 10, pp. 904–906, October, 1988.

Currently, there exists a number of all-optical switching devices, including the birefringent-fiber polarization switch, the optical-fiber Kerr gate, the two-core-fiber nonlinear directional coupler, the birefringent single-core-fiber, the nonlinear fiber-loop mirror, the soliton dragging logic gate, the bistable nonlinear optical switching device, the spatial soliton beam switch in a planar waveguide, the nonlinear polarization switch in a semiconductor waveguide including a multiquantum well waveguide, the semiconductor interferometer switch, the nonlinear Bragg semiconductor waveguide switch, and the bistable optical switch. A general description of such all-optical devices can be found in Saleh, B. E. A., and Teich, M. C., "Fundamentals of Photonics", John Wiley, 1991; and Agrawal, G. P., "Nonlinear Fiber Optics", Academic Press, 2nd Ed., 1995.

Spatial and temporal solitons have been produced in the laboratory and used for all-optical switching. Bell, T. E., in an article entitled "Light that acts like 'natural bits', IEEE Spectrum, pp. 56–57, August 1990, introduces the different types of solitons (temporal and spatial), and the possible uses of these solitons mainly in fiber optic communications, i.e., temporal solitons for long range communications and spatial solitons for optical switching. Reference is also made to Aitchison, J. S., Weiner, A. M., Silberberg, Y., Oliver, M. K., Jackel, J. L., Leaird, D. E., Vogel, E. M., and Smith, P. W. E., "Observation of spatial optical solitons in a nonlinear planar waveguide," Optics Letters, Vol. 15, No. 9, pp. 471–473, May 1, 1990, which describes the power levels for creating spatial solitons beams in the laboratory, and the process of making a corresponding waveguide.; and to Aitchison, J. S., Silberberg, Y., Weiner, A. M., Leaird, D. E., Oliver, M. K., Jackel, J. L., Vogel, E. M., and Smith, P. W. E., "Spatial optical solitons in planar glass waveguides," Journal Optical Society of America B, Vol. 8, No. 6, pp. 1290–1297, June 1991, which further describes the interaction between solitons beams, and the type of glass material used (Schott B270 glass). Both of these articles to Aitchison et al. are incorporated herein by reference. This type of glass has a relatively weak nonlinear index of refraction ($n_2$) with a nonlinearity value $n_2=3.4\times10^{-16}$ cm$^2$/W.

The power requirements for an optical soliton decreases as the strength of the nonlinear index of refraction increases. Therefore, the use of highly nonlinear glasses is preferable because they have larger nonlinear indices of refraction, and will significantly reduce the power requirements for the solitons.

Borrelli, N. F., Aitken, B. G., and Newhouse, M. A., in an article entitled "Resonant and non-resonant effects in photonic glasses," Journal of Non-Crystalline Solids, pp. 109–122, Vol. 185, (1995), which is incorporated herein by reference, publishes the result of research done on glasses and polymers that exhibit large nonlinear susceptibilities, and list these materials and their characteristic properties on page 111. However, this article does not address the future possibility of generating light bullets using the listed materials. Reference is made to pages 120 and 121, "4. Conclusion/future".

In a nonlinear optical material, temporal soliton pulses are confined in the direction transverse to propagation by propagating in a fiber. A more maneuverable temporal soliton would be able to move in a transverse direction, such as in a planar slab waveguide. Such special types of solitons are referred to as "light bullets". Light bullets are essentially pulses of light which, when propagating in a nonlinear material, maintain their shapes under the effect of diffraction (spreading transverse to the direction of propagation), dispersion (spreading in the direction of propagation), and nonlinearity.

However, light bullets have so far only been studied theoretically, and have not yet been produced in a laboratory. Additionally, until recently, light bullets were believed to be unstable, unless the material is saturable. Reference is made to Silberberg, Y., "Collapse of optical pulses", Optics Letters, Vol. 22, pp. 1282–1284, Nov. 15, 1990, which states "the saturation of the nonlinear index (practically attainable only in gaseous systems)". The analysis in this article is based on the nonlinear Schrödinger equations, which, in turn, is an approximation of Maxwell's equations. In essence, the author stated that light pulses will collapse. However, this analysis resorted to an approximation which neglects higher order terms in resolving Maxwell's equations, and did not take into account factors that limit the collapse, such as higher order dispersion.

A computer simulation that uses the exact Maxwell's equations without any approximation, and which therefore automatically accounts for higher order terms of all orders that would occur in an approximate approach, was done and was published by Goorjian, P. M. and Silberberg, Y. "Numerical simulations of light bullets, using the full vector, time dependent Maxwell equations," Nonlinear Optics Topical Meeting, IEEE/Lasers and Electro-Optics Society and Optical Society of America, Waikoloa, Hawaii, Jul. 24–29, 1994.; and Goorjian, P. M. and Silberberg, Y., "Numerical simulation of light bullets, using the full vector, time dependent Maxwell equations," Integrated Photonics Topical Meeting, cosponsored by the Optical Society of America and IEEE/Lasers and Electro-Optics Soc., Dana Point, Calif., Feb. 23–25, 1995. Both of these articles are incorporated herein by reference.

This later study showed that light bullets are in fact stable, and that there is no need for saturating the material to obtain stability. This study also very briefly mentions that light bullets can deflect each others' travel paths upon collision. These light bullets will be on the order of 25 to 250 femtoseconds in duration, where one femtosecond is one millionth of one billionth of a second ($10^{-15}$ second). This study proposed a mathematical model for light bullets and used a hypothetical nonlinear optical material with conjectured dispersion parameters.

None of the existing or previously proposed all-optical switching devices uses or proposes the use of light bullets in planar slab waveguides made from commercially available nonlinear optical glass. Several of the prior devices are relatively large physically or use relatively large optical pulses, as compared to the proposed device. In some of those prior devices, such as the two-core-fiber nonlinear directional coupler, the light pulses interact relatively weakly through evanescent waves. The spatial soliton devices suffer from the effects of dispersion on the pulses and the temporal soliton devices are confined to fibers and hence do not have the maneuverability of pulses in waveguides. None of the prior devices use light bullets, which are extremely small, maneuverable and do not degrade on propagation, (i.e., are self-sustainable).

Therefore, there is still a great and unsatisfied need for a practical realization of an ultra-fast all-optical photonic switching device utilizing light bullets. The material used to build this device should be readily available and relatively inexpensive to manufacture, and it should further exhibit characteristic parameters that are adequate for the production of light bullets.

SUMMARY OF THE INVENTION

The present invention provides a unique ultra-fast, all-optical switching device made with readily available, relatively inexpensive, highly nonlinear optical materials, including highly nonlinear optical glasses, semiconductor crystals and/or multiple quantum well semiconductor materials. This switching device uses stable light bullets as optical pulses that switch each others' direction of propagation. As used herein, "ultra-fast" optical devices are defined to include optical devices in which the nonlinear response of the material is electronic in origin and hence the response of the material is on the order of a few femtoseconds.

In one embodiment, the switching device of the present invention utilizes a planar slab waveguide.

One advantage presented by the present all-optical switching device lies in its practical use of light bullets, thus preventing the degeneration of the pulses due to dispersion and diffraction at the front and back of the pulses.

Another feature of the present all-optical switching device is the relative insensitivity of the collision process to the time difference in which the counter-propagating pulses enter the waveguide, since, contrary to conventional co-propagating spatial solitons, the relative phase of the colliding pulses does not affect the interaction of these pulses.

Yet another feature of the present all-optical switching device is the selection of the light pulse parameters which enables the generation of light bullets in nonlinear optical materials.

Briefly, the foregoing and other features of the present invention are achieved by providing a unique ultra-fast, all-optical switching device made with readily available, relatively inexpensive, highly nonlinear optical materials, including highly nonlinear optical glasses, semiconductor crystals and/or multiple quantum well semiconductor materials. These materials have a sufficiently negative group velocity dispersion and high nonlinear index of refraction to support stable light bullets. The light bullets counter-propagate through, and interact within the waveguide to selectively change each others' directions of propagation into predetermined channels. In one embodiment, the switch utilizes a rectangularly planar slab waveguide, and further includes two central channels and a plurality of lateral channels for guiding the light bullets into and out of the waveguide.

Since many semiconductor materials have larger nonlinear indices of refraction than nonlinear glasses, the power requirement to form light bullets will be less. The power requirement for light bullets traveling in nonlinear glasses is about 150 kW. The power requirement for similar light bullets traveling in such semiconductor crystals is reduced by a factor of about ten relative to nonlinear glasses, to approximately 15 kW. Also, multiple quantum well can be made from semiconductor crystals. The power requirement for light bullets traveling in multiple quantum well semiconductor materials is reduced by a factor of up to about ten million relative to nonlinear glasses, to approximately 0.01 W.

BRIEF DESCRIPTION OF THE DRAWINGS

The above and other features of the present invention and the manner of attaining them are explained by the following description and the accompanying drawings, wherein.

Similar numerals refer to similar elements in the drawing. It should be understood that the sizes of the different components in the Figures are not in exact proportion, and are shown for visual clarity and for the purpose of explanation.

DETAILED DESCRIPTION OF THE INVENTION

Figure 1:
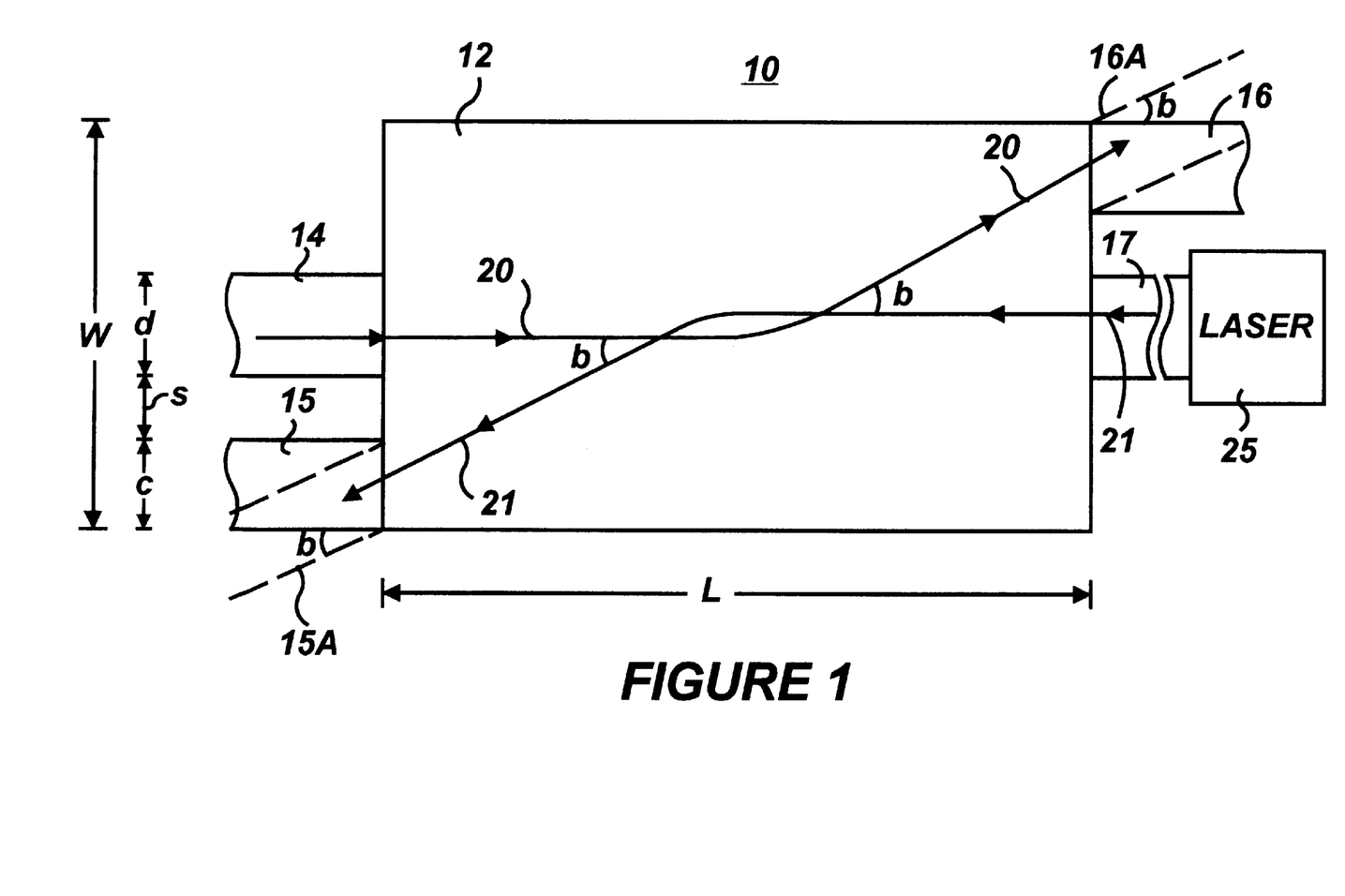
FIG. 1 is a schematic top plan view of a four-channel switching device made according to the present invention.

FIG. 1 illustrates a four-channel ultra-fast, all-optical switch or switching device 10 according to the present invention. The switch 10 includes a single planar, rectangularly shaped slab waveguide 12 and a plurality of channels 14, 15, 16 and 17 that integrally depend from the waveguide 12 to provide input and output paths for the switch 10. The switch 10 may be made from highly nonlinear optical materials, including highly nonlinear optical glasses, semiconductor crystals and/or multiple quantum well semiconductor materials, and uses stable light bullets 20, 21 as optical pulses to switch each others' direction of propagation.

In this exemplary embodiment, the waveguide 12 is rectangularly shaped, and has a length "L" of about 1 cm, a width "W" of about 950 μm, and a thickness of about 2 μm. It should be clear to those of ordinary skill in the field that other shapes and dimensions may be selected. In particular, the waveguide length "L" is not necessarily limited to 1 cm, and other dimensions can be selected.

Figure 5:
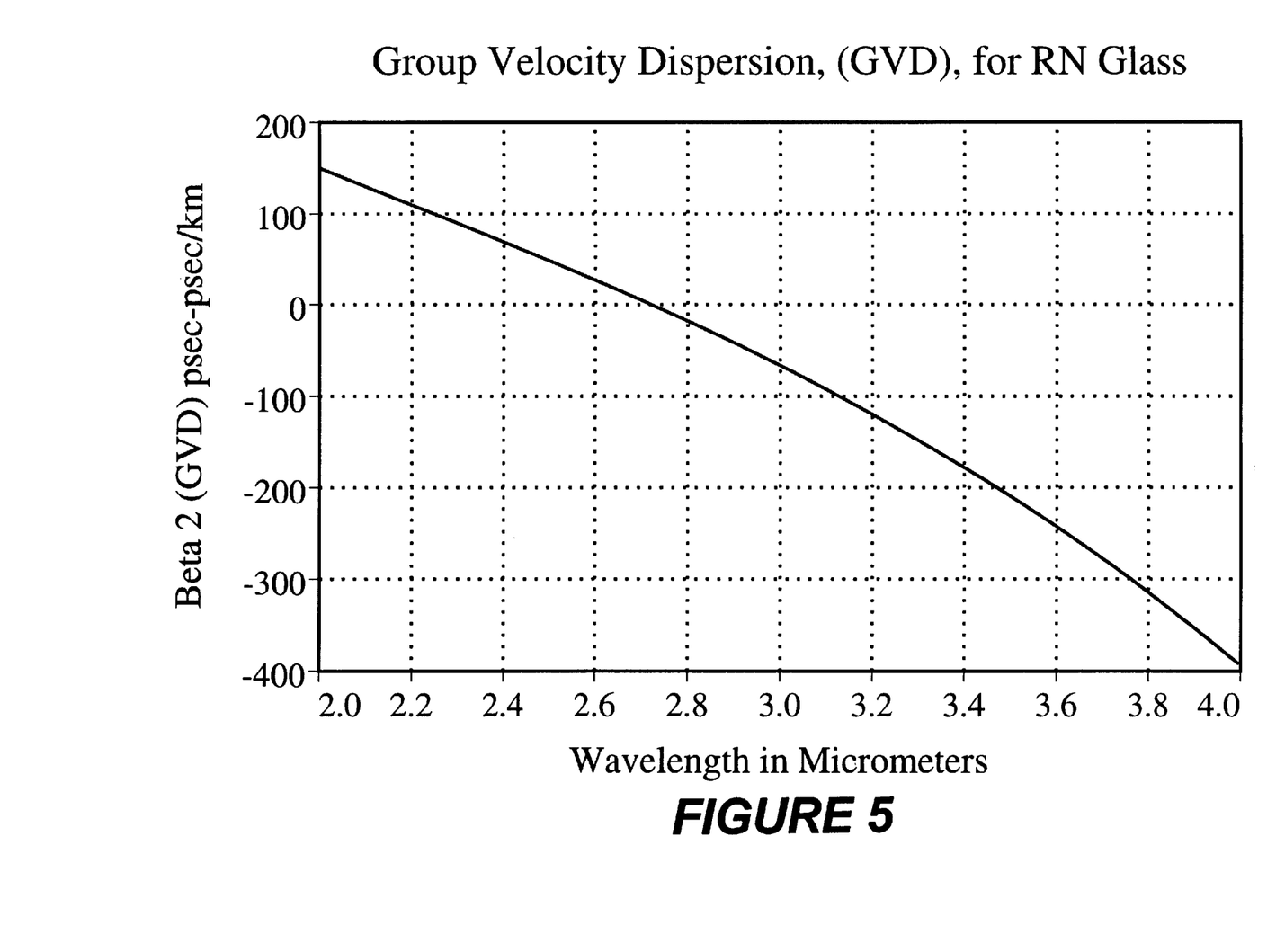
FIG. 5 is a graph plotting the group velocity dispersion (also known as GVD or beta 2) versus the wavelength of a nonlinear RN glass, which is to be used in the fabrication of the switching device according to the present invention.

Having provided a general overview of the major components and operation of the switch 10, selected candidate materials for use in the switch 10 will now be described. A first proposed nonlinear photonic glass is lead\-bismuth-gallate glass, developed at Corning Research and Development Laboratory, and named RN glass. This type of glass and its corresponding parameters are described in the above article to Borrelli et al. This photonic glass is a doped glass, and is highly nonlinear. It has a nonlinear index of refraction $n_2 = 1.11 \times 10^{-14}$ cm$^2$/W, which is about three times stronger than the glass proposed in the above Aitchison articles. Using RN glass with a wavelength of about 3.5 μm gives a group velocity dispersion of −220 psec$^2$/km, as shown in FIG. 5.

As explained in the Saleh et al., and Agrawal references cited above, the nonlinear effect is due to the product of the nonlinear index of refraction ($n_2$) times the intensity of the optical pulse. Therefore, as the nonlinear index of refraction ($n_2$) is increased, the power requirement can be decreased, since the power requirement is inversely proportional to the nonlinear index of refraction ($n_2$). It would thus be desirable to use the highest available nonlinearity at low power levels, provided the other waveguide material parameters are suitable for the production of light bullets.

Some semiconductor crystals, such as GaAs and InP, have larger nonlinear indices of refraction than nonlinear glass, and as such, they may be selected as appropriate materials for the optical switch 10. Other semiconductor crystals, such as the wide-bandgap material GaN, will allow shorter operating optical wavelengths than narrower bandgap materials, such as GaAs and InP, and as such, they may be selected as appropriate materials for the optical switch 10. Optical properties of a few semiconductor materials will now be described.

Semiconductor materials have wavelength regions, within the infrared wavelength region in which they are optically transparent. These regions depend on the individual semiconductor material, as described in Saleh, B. E. A., and Teich, M. C.: Fundamentals of Photonics, John Wiley, 1991, p. 175; Pankove, J. I.: Optical Processes in Semiconductors, Prentice-Hall, Inc., N.J., (1971), p.98; and Grey, D. E.: American Institute of Physics Handbook, 3rd Ed., McGraw-Hill, New York (1972), p. 6–60, which are incorporated herein by reference. Some of these materials are III-V binary semiconductors, and other combinations of elements from groups III and V can form ternary and quaternary semiconductors as described in Saleh, B. E. A., and Teich, M. C.: Fundamentals of Photonics, John Wiley, 1991, pp. 547–551, which is incorporated herein by reference.

Two exemplary materials, i.e., Gallium Arsenide (GaAs) and Indium Phosphide (InP) will be used to make estimates of the power required in the optical pulses. Both of these materials have low losses from absorption in the transparency region. Reference is made to Driscoll, W. G., and Vaughan, W.: Handbook of Optics, sponsored by the Optical Society of America, McGraw-Hill, New York (1978), pp. 7-26 through 7-30, 7-32, 7-49, which is incorporated herein by reference.

As described in Weber, M. J.: CRC Handbook of Laser Science and Technology, Vol. III, Optical Materials, Part 1: Nonlinear Optical Properties and Radiation Damage, CRC Press, Inc., (1986), pp. 102–106, 121, 202, 203, 273–275, the nonlinear index of refraction ($n^2$) of GaAs crystals equals $1.7 \times 10^{-13}$ cm$^2$/W for wavelengths from 9.2 to 11.8 microns. The nonlinear index of refraction ($n_2$) for InP in the same wavelength region, i.e., 9.2 to 11.8 microns, is estimated to be about equal to $2.4 \times 10^{-13}$ cm$^2$/W. This estimate was made by using the formulas in Sheik-Bahae, M., Hutchings, D. C., Hagen, D. J., and Van Stryland, E., W.: "Dispersion of Bound Electronic Nonlinear Refraction in Solids," IEEE Journal of Quantum Electronics, Vol. 27, No. 6, June 1991, pp. 1296–1309 and the value of $n_2$ for GaAs. Also, as described in Sheik-Bahae et al., wide-bandgap semiconductors, such as GaN, also have positive values of $n^2$, although smaller, in an equivalent range of wavelengths. Additional information on semiconductors, including GaAs, InP, and GaN, is provided in Madelung, Otfried, (Editor): Semiconductors-Basic Data, 2nd revised Edition, Springer, 1996, pages 86, 101, 122. These three references are incorporated herein by reference.

In addition, the group velocity dispersion (GVD) of the nonlinear optical material is needed to estimate the power requirement for the light bullet optical pulses. The GVD for several semiconductor crystals and for glasses, including GaAs, InP and GaN, can be determined from the dispersion formulas in Bass, M., Van Stryland, E. W., Williams, D. R., and Wolfe, W. L.: Handbook of Optics, Vol. II, Devices, Measurements, and Properties, 2nd Ed., sponsored by the Optical Society of America, McGraw-Hill, New York (1995), pp. 33.61–33.68, which is incorporated herein by reference.

Referring back to FIG. 1, the four channels 14 through 17 are comprised of two generally identical, elongated central channels 14, 17 that are oppositely disposed relative to the waveguide 12. The axes of symmetry of these two central channels 14, 17 coincide. Each of the central channels 14, 17 has a width "d" of about 25 µm. The other two side or lateral channels 15, 16 are disposed on either side of the waveguide 12, in a generally symmetrical relation relative to the geometrical center of the waveguide 12. Each of the exit channels 15, 16 has a width "c" of about 20 µm, and is separated from its respective adjacent central channel 14, 17, by a distance "s" of about 15 µm.

In use, a sequence of counter-propagating light bullets 20, 21 are selectively injected through the central channels 14, 17, into the waveguide 12, so that they change each others' direction of propagation, thus achieving all-optical switching. A light bullet 20 that is sent into the waveguide 12 from the central channel 14 will propagate through the waveguide 12 along a straight travel path, and will exit into the central channel 17. When two counter-propagating light bullets 20, 21 are introduced into the waveguide 12 from the central channels 14 and 17, and are axially displaced relative to each other, in the transverse direction, by the spatial width $a_0$ of a single light bullet, these light bullets 20, 21 will collide and will deflect each other.

This interaction is an attractive one in that the light bullets 20, 21 attract each other as they pass. The result will be that the light bullets 20, 21 entering from the central channels 14 and 17, will exit into the lateral channels 16 and 15, respectively. The interaction between the light bullets 20, 21 forms the mechanism for the optical switch 10.

In the example illustrated in FIG. 1, the light bullet 20 from the central channel 14 is displaced downward with respect to the light bullet 21 from the central channel 17, causing the deflection angle "b" to be approximately ½° (one half of one degree). It should however be clear that the deflection angle may have different values, as desired, to better suit the particular application in which the switch 10 is used. In some designs, it would be preferable to select the largest obtainable value for the deflection angle. The deflection angle is determined by the light bullet power level, the material parameters and the shape of the light bullet pulse. For instance, if the light bullet power intensity were increased, the deflection angle would increase accordingly. Additionally, the deflection angle determines the length "L" of the waveguide 12.

The light bullets 20, 21 used in the switch 10 have a temporal duration of approximately 100 femtoseconds, where the duration is the measure of the full width at half maximum value (FWHM) divided by 1.76 of the peak value of the intensity of the electric field. For RN glass, the proposed wavelength of the optical carrier is about 3.5 µm, which is in the infrared wavelength range. Referring to FIG. 5, the group velocity dispersion (GVD) for RN glass is calculated at this wavelength, and is found to be −220 psec$^2$/km, where "psec" refers to picoseconds.

Using the formulas in Bass, M., Van Stryland, E. W., Williams, D. R., and Wolfe, W. L.: Handbook of Optics, Vol.

Figure 6:
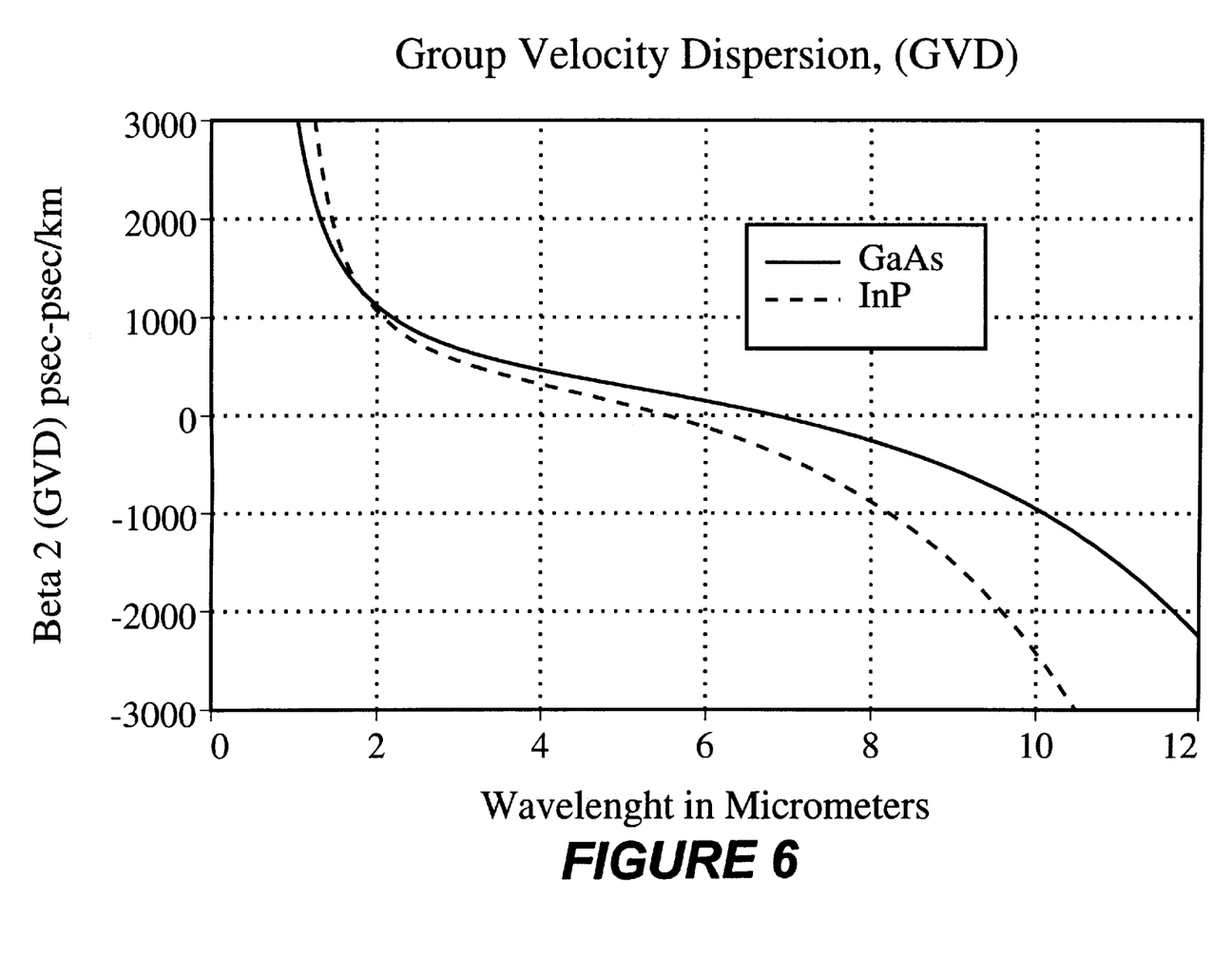
FIG. 6 is a graph plotting the group velocity dispersion (GVD or beta 2) versus the wavelength of two semiconductor crystals, namely, Gallium Arsenide (GaAs) and Indium Phosphide (InP), which are to be used in the fabrication of the switching device according to the present invention.
Figure 7:
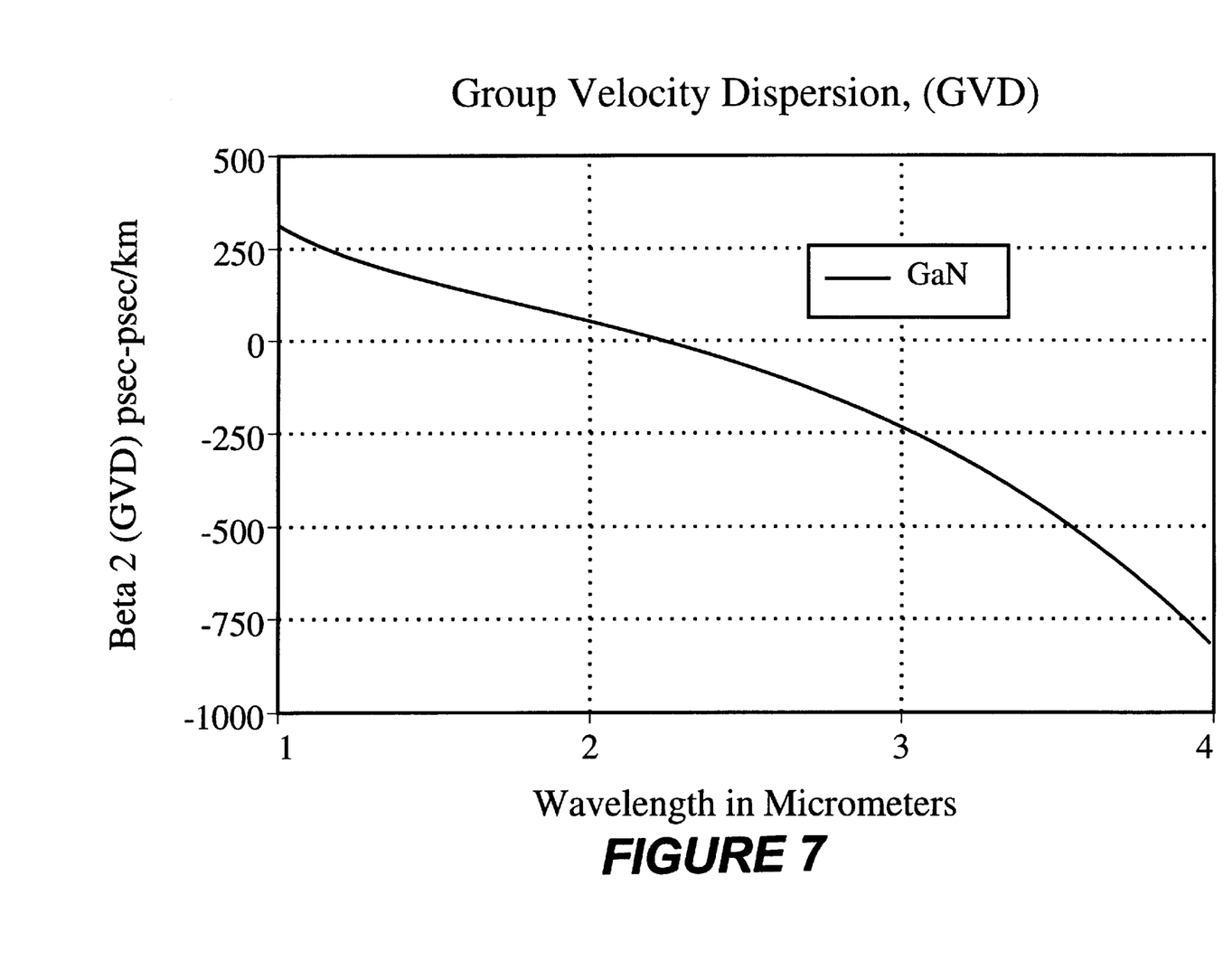
FIG. 7 is a graph plotting the group velocity dispersion (GVD or beta 2) versus the wavelength of the wide-bandgap semiconductor crystal Gallium Nitride (GaN), which is to be used in the fabrication of the switching device according to the present invention.

II, Devices, Measurements, and Properties, 2nd Ed., sponsored by the Optical Society of America, McGraw-Hill, New York (1995), pp. 33.61–33.68, for GaAs, InP and GaN, the wavelengths at which the GVD equals −220 psec2/km, are found to occur are 7.85 microns for GaAs, 6.35 microns for InP, as indicated in FIG. 6, and 2.97 microns for GaN, as indicated in FIG. 7.

Figure 8:
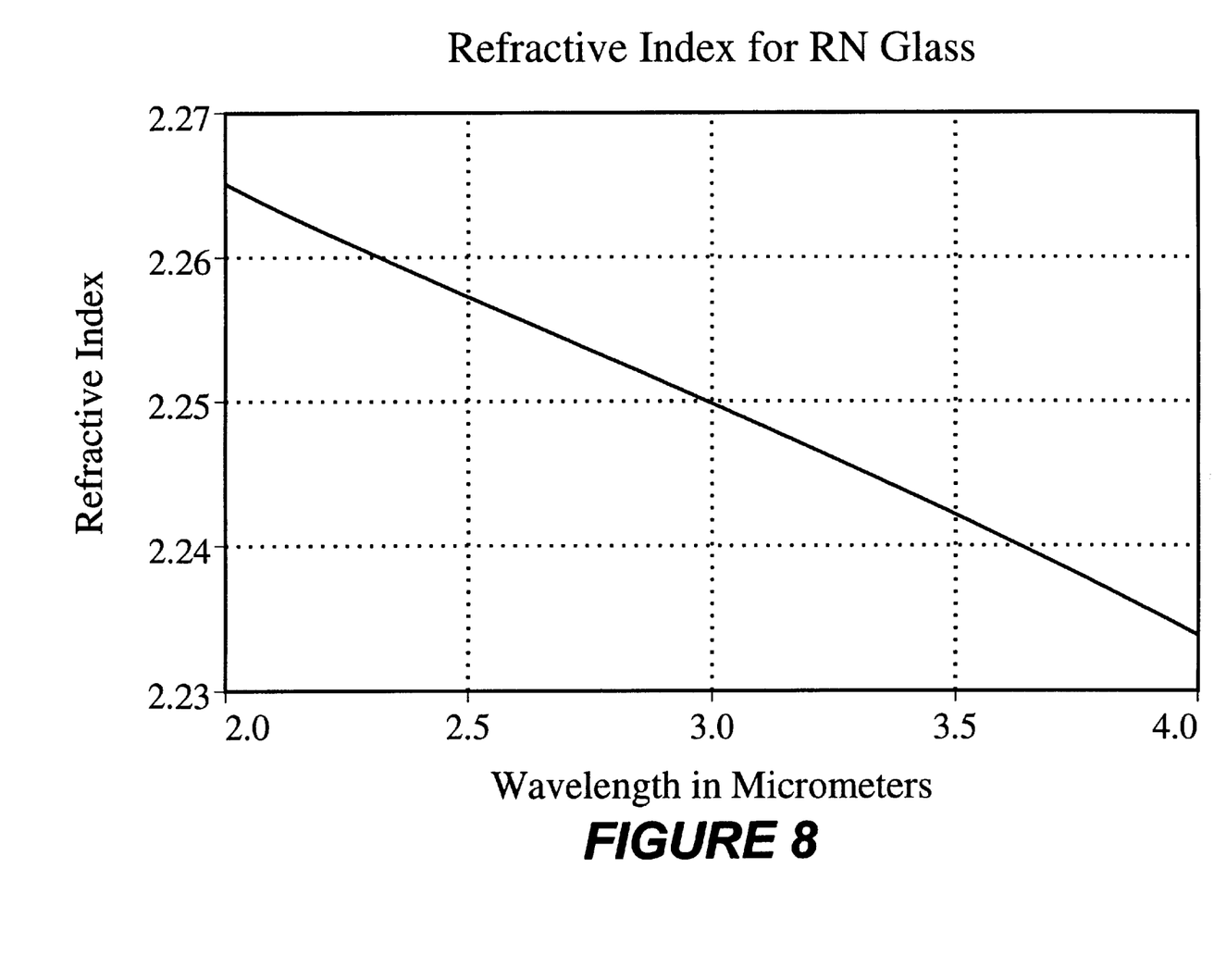
FIG. 8 is a graph plotting the linear index of refraction (e.g. $n_0$) versus the wavelength of RN glass, which is to be used in the fabrication of the switching device of according to the present invention.
Figure 9:
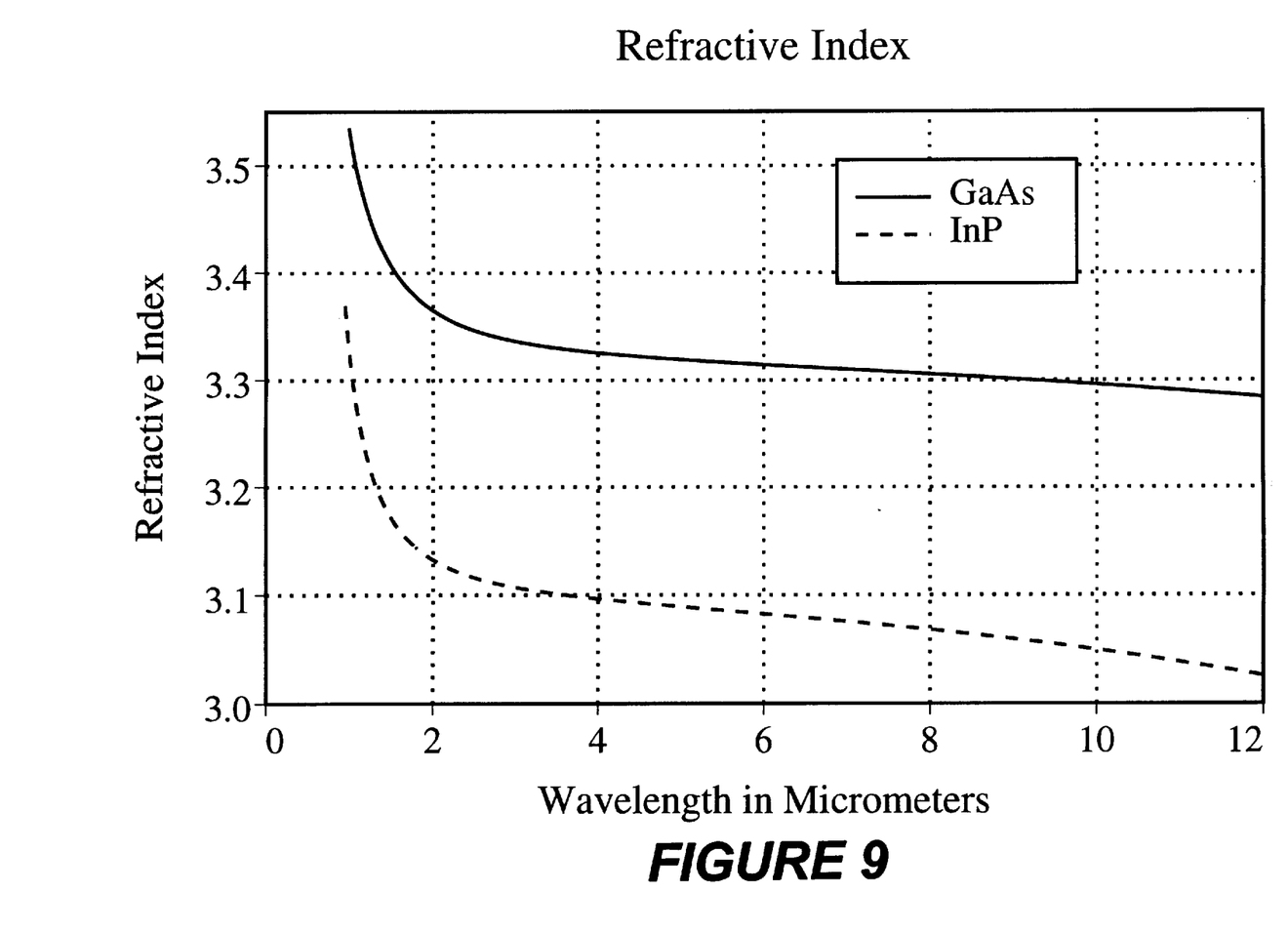
FIG. 9 is a graph plotting the linear index of refraction (e.g. $n_0$) versus the wavelength of the two semiconductor crystals (viz. GaAs and InP), which is to be used in the fabrication of the switching device according to the present invention.
Figure 10:
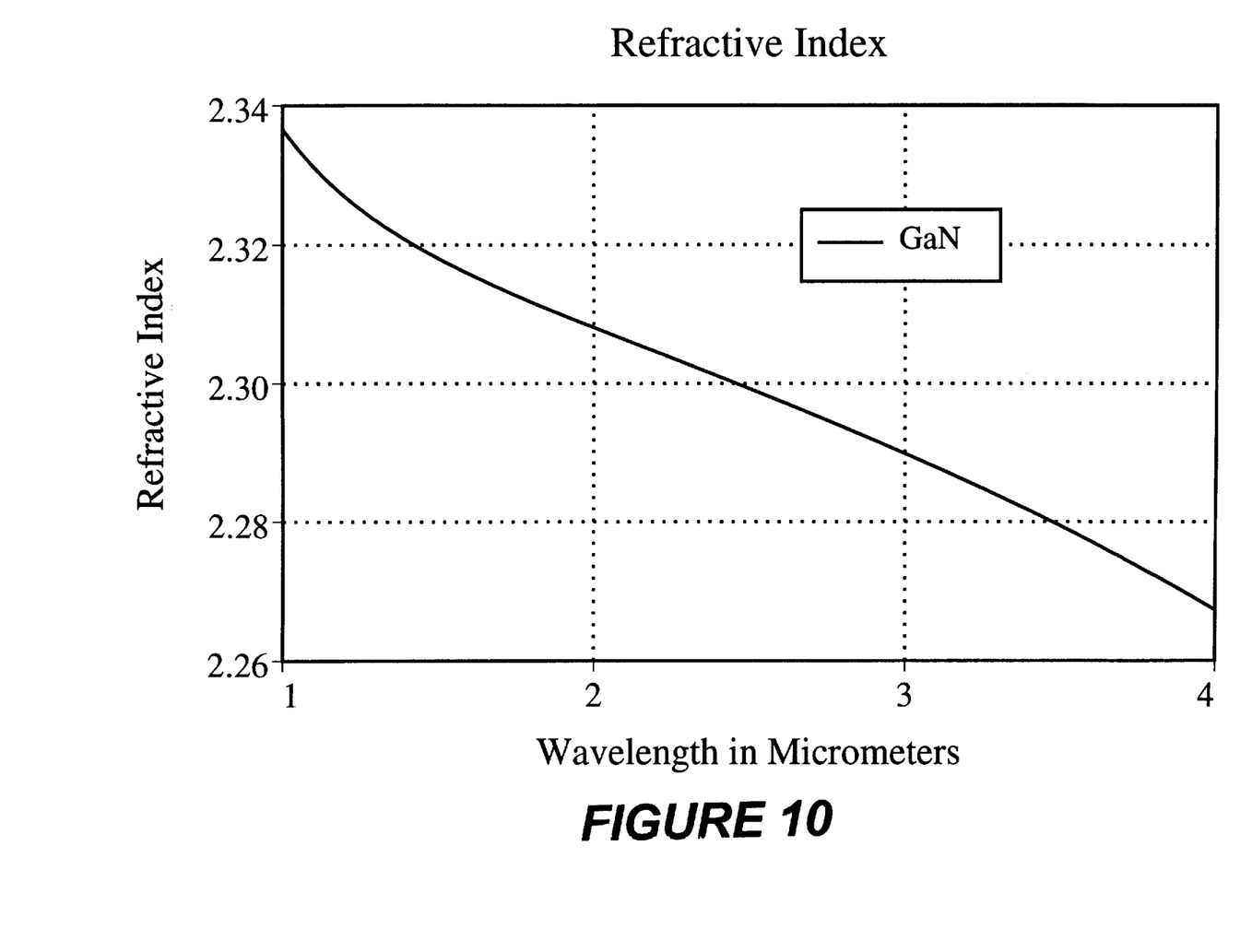
FIG. 10 is a graph plotting the linear index of refraction (e.g. $n_0$) versus the wavelength of the wide-bandgap semiconductor crystal Gallium Nitride, which is to be used in the fabrication of the switching device according to the present invention.

The linear indices of refraction no for RN glass (FIG. 8), GaAs and InP (FIG. 9), and GaN (FIG. 10) provide needed data for estimating the power requirements for light bullet formation in the respective materials. The linear index of refraction for RN glass is 2.24 at a wavelength of 3.5 microns. The linear index of refraction for GaAs is 3.31 at a wavelength of 7.85 microns. The linear index of refraction for InP is 3.08 at a wavelength of 6.35 microns. The linear index of refraction for GaN is 2.29 at a wavelength of 2.97 microns.

The spatial width $a_0$ of the pulse forming the light bullets 20, 21, is estimated to be 10 $\mu$m. The transverse mode size of the pulse is estimated to equal the thickness of the waveguide, which is about 2 $\mu$m. The required power to produce the light bullet can be estimated by using the equations in Aitchison, J. S., Silberberg, Y., Weiner, A. M., Leaird, D. E., Oliver, M. K., Jackel, J. L., Vogel, E. M., and Smith, P. W. E.: "Spatial optical solitons in planar glass waveguides," Journal Optical Society of America B, Vol. 8, No. 6, pp. 1290–1297, June 1991, in particular equation (4).

For RN glass, the required power to produce the pulse is estimated to be 150 kW, which is within the capability of currently available laser equipment, i.e., laser 25. The corresponding energy in a pulse is estimated to be 15 nanojoules ($15 \times 10^{-9}$ joules), which is a significantly small amount of energy.

The required power to produce the pulse is estimated to be 11 kW for GaAs, and 8.1 kW for InP. As a result, by using various semiconductor crystals that have properties similar to these two, the power requirements for the optical pulses can be expected to be about ten times less than for the highly nonlinear glass RN.

Although semiconductor crystals allow a decrease in the power required for the proposed optical switch 10 by a factor of about ten relative to the power requirement for RN glass, the use of quantum well semiconductor materials will allow a further significant reduction in the power requirement. For additional information on the fundamentals of multiple quantum wells reference is made to Saleh, B. E. A., and Teich, M. C.: Fundamentals of Photonics, John Wiley, 1991.

As described in Sirtori, C., Capasso, F., and Cho, A. Y.: "New Class of Coupled-Quantum-Well Semiconductors with Large Electric Field-Tunable Nonlinear Susceptibilities in the Infrared," in Physical Concepts and Materials for Novel Optoelectronic Device Applications II, F. Beltram and E. Gornik, Eds., Proc. SPIE 1985, pp. 158–169, (1993); Sirtori, C., Capasso, F., Sivco, D. L., and Cho, A. Y.: "Giant, Triply Resonant, Third-Order Nonlinear Susceptibility in Coupled Quantum Wells," Physical Review Letters, Vol. 68, No. 7, Feb. 17, 1992, pp. 1010–1013; and Grave, I., Segev, M., and Yariv, A.: "Observation of Phase Conjugation at 10.6 Microns Via Intersubb and Third-Order Nonlinearities in a GaAs/AlGaAs Multi-Quantum-Well Structure," Appl. Phys. Lett., Vol. 60, No. 22, Jun. 1, 1992, pp. 2717–2719, all of which are incorporated herein by reference, the third order nonlinear susceptibility in semiconductors has been greatly increased by the use of multiple quantum well (MQW) structures in the semiconductor materials. The MQW structures that utilize AlInAs/GaInAs materials showed increases in nonlinear susceptibilities of five to six orders of magnitude greater than those associated with bound electrons in InAs and GaAs at comparable wavelengths. The MQW structures that used GaAs/AlGaAs showed comparable increases of over four orders of magnitude. These measurements were made at wavelengths of about 10.5 microns. For these materials, the nonlinear index of refraction ($n^2$) ranges between about 10-9 $cm^2$/W and 10-7 $cm^2$/W. It should be understood that various other MQW materials may be used. For example, with reference to Han, K. Y., Chen, C. W., Quigley, J. H., Hafich, M., Robinson, G. Y., Chang, R., and Lile, D. L.: "InP/InGaAs Based Charge-Coupled Devices for MQW Spatial Light Modulator Applications," First International Conference on Indium Phosphide and Related Materials for Advanced Electronic and Optical Devices, R. Singh, L. J. Messick, Eds., Proc. SPIE 1144, pp. 398–413, at 398, 399 (1989), which is incorporated herein by reference, InGaAs/InP may exhibit relatively lower absorptive losses. Also, GaN/AlGaN MQW materials are another candidate material and would be able to operate at relatively shorter wavelengths. Since the power requirement for a light bullet is inversely proportional to the nonlinear susceptibility of the material and the power requirement for semiconductor crystals is about 10 kW, the power requirement for the MQW structure may range as low as from about 0.01 Watt to about 1 Watt, which are small, practical amounts.

While a particular example of the switch 10 has been described, it should be understood that alternative pulse shapes, sizes and intensities may be possible to determine the optimal properties of the light bullets. For instance, various carrier frequencies are possible since the value of the group velocity dispersion changes with frequency. Also, it is possible to use different frequencies for the counter-propagating light bullets 20, 21. These alternative changes can be aimed at producing narrower light bullets with higher intensities for stronger interactions under collision. In addition, by increasing the power of the light bullets, the size of the switch 10 may be reduced accordingly.

Examples of alternative nonlinear photonic glasses, such as those listed in Borrelli, N. F., Aitken, B. G., and Newhouse, M. A., "Resonant and non-resonant effects in photonic glasses," Journal of Non-Crystalline Solids, pp. 109–122, Vol. 185, (1995), may be used to generate light bullets with the desired characteristic properties. Examples of alternative semicondutor materials for use in the switch 10 to generate light bullets with the desired properties may be found in Saleh, B. E. A., and Teich, M. C.: Fundamentals of Photonics, John Wiley, 1991; Pankove, J. I.: Optical Processes in Semiconductors, Prentice-Hall, Inc., N.J., (1971), p.98;Grey, D. E.: American Institute of Physics Handbook, 3rd Ed., McGraw-Hill, New York (1972), p. 6–60.; Driscoll, W. G., and Vaughan, W.: Handbook of Optics, sponsored by the Optical Society of America, McGraw-Hill, New York (1978), pp. 7-26 through 7-30, 7-32, 7-49; Weber, M. J.: CRC Handbook of Laser Science and Technology, Vol. III, Optical Materials, Part 1: Nonlinear Optical Properties and Radiation Damage, CRC Press, Inc., (1986), pp. 102–106, 121, 202, 203, 273–275; and Bass, M., Van Stryland, E. W., Williams, D. R., and Wolfe, W. L.: Handbook of Optics, Vol. II, Devices, Measurements, and Properties, 2nd Ed., sponsored by the Optical Society of America, McGraw-Hill, New York (1995), pp. 33.61–33.68, all of which are incorporated herein by reference.

An objective of the present invention is to obtain the minimum power requirements and the most practical operating wavelength for the desired application. At a predetermined intensity, it is possible to select a group velocity dispersion of the material, which, when considered with other parameters, determines the width and the power level of the light. For each material a wavelength must be determined in order to obtain a reasonable amount of negative group velocity dispersion. This value of group velocity dispersion is used together with the nonlinear index of refraction and intensity to determine the length and width of a pulse that will form a light bullet. Also, the intensity is chosen to satisfy two requirements. First, a reasonable power level that is attainable with available power sources, such as laser equipment; and second, the intensity is such that it is sufficient to produce a strong interaction between colliding light bullets.

FIG. 1 illustrates a modification to the switch 10, in which the lateral channels 15A and 16A (shown in dashed lines) are so positioned as to form an angle "b" (i.e., equal to the deflection angle) with respect to the central axis of the waveguide 12. In such a design, the deflected light bullets 20, 21 exit the waveguide 12 through the exit lateral channels 16A and 15A, parallel to the sides of these channels.

While the foregoing switch design has been proposed relative to a thin film planar slab waveguide 12, it should be understood that the waveguide 12 may be made from bulk (i.e., thick) material for providing the light bullets with other directions of propagation, including directions of propagation out of the plane of the waveguide 12 (FIG. 1).

Figure 2:
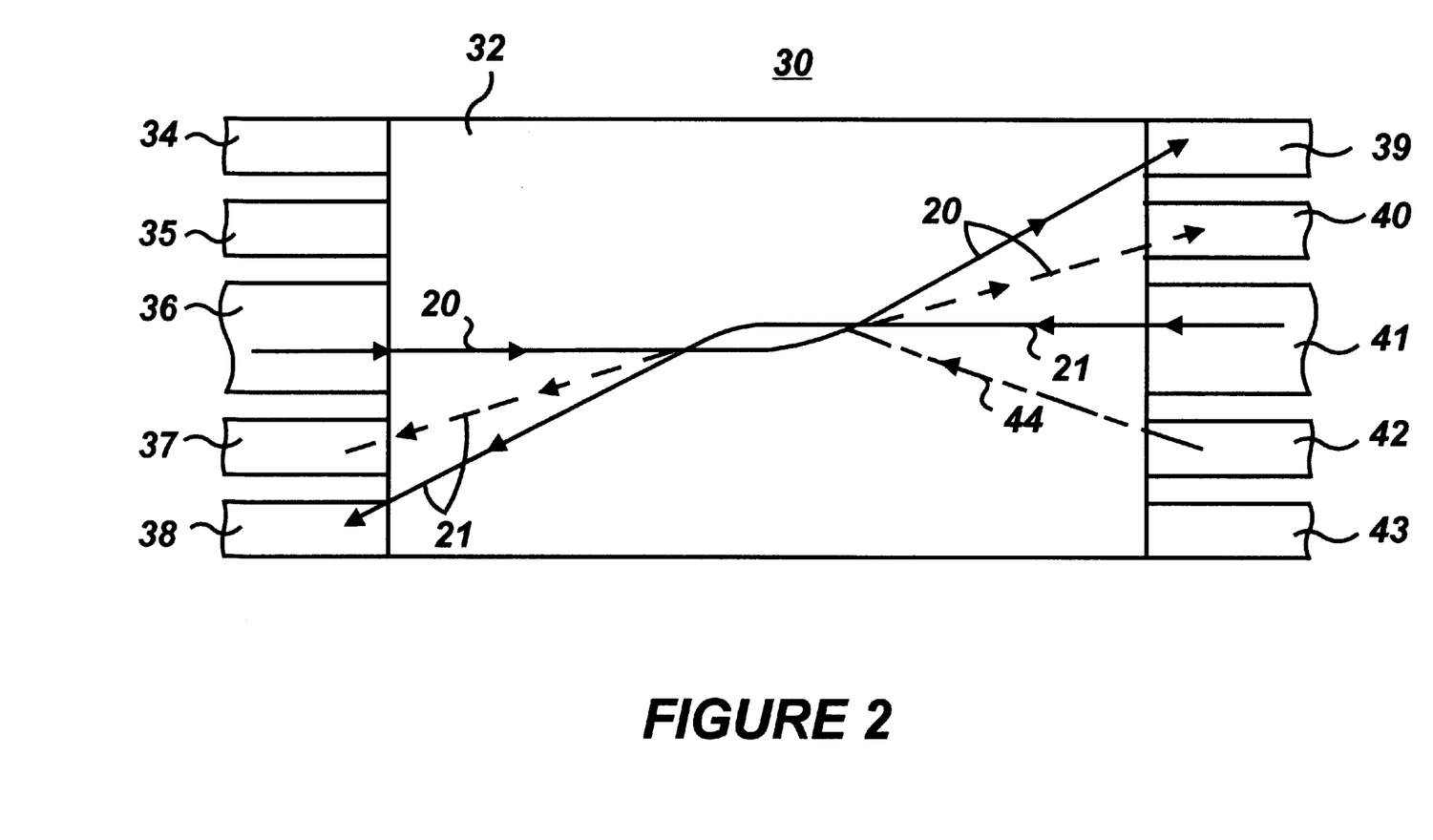
FIG. 2 is a schematic top plan view of a multi-channel switching device made according to the present invention, and showing two possible switching paths.
Figure 3:
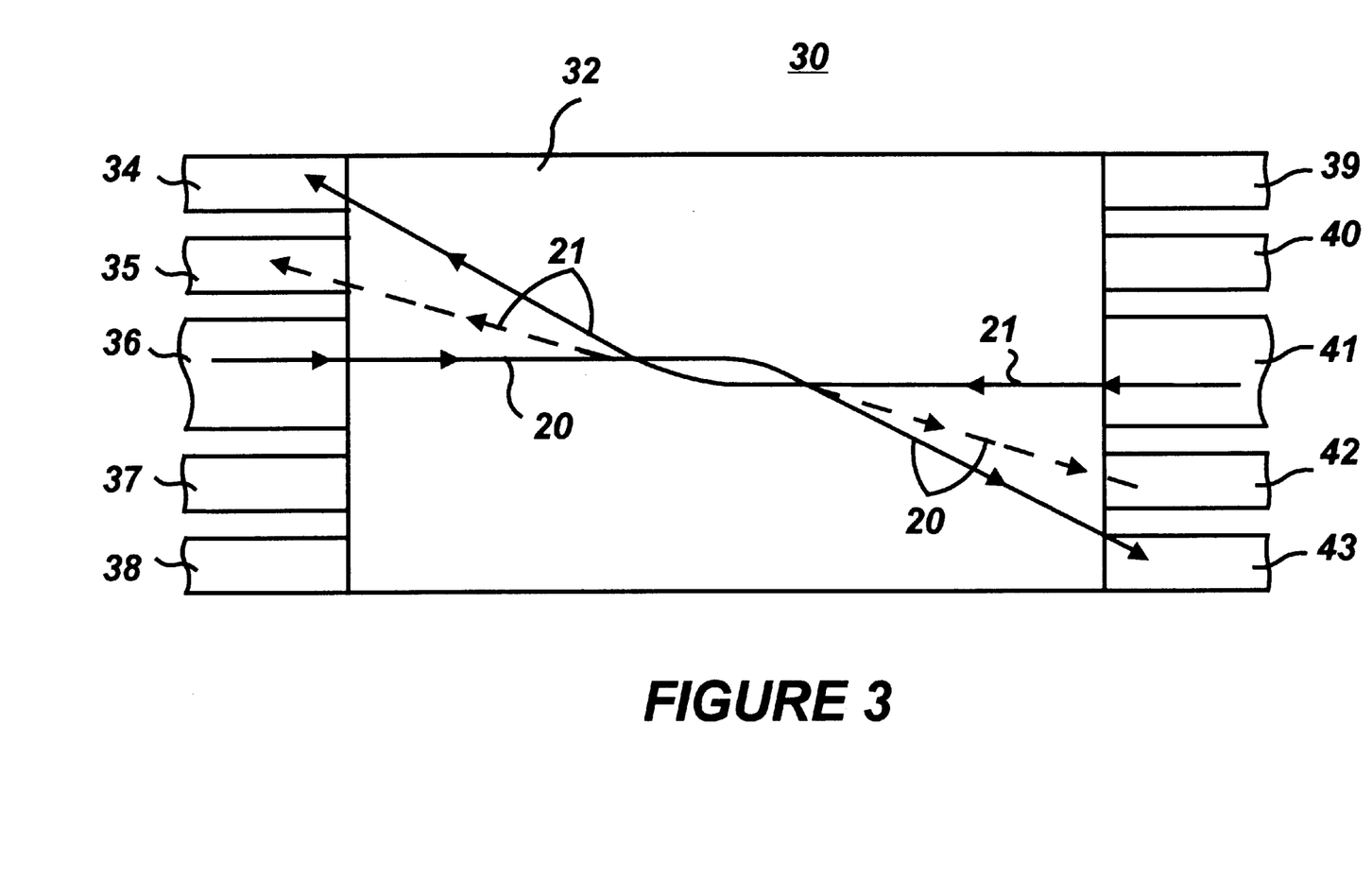
FIG. 3 is a schematic top plan view of the multi-channel switching device of FIG. 2, showing two additional switching paths.

FIGS. 2 and 3 illustrate another switch design, wherein a switch 30 includes a waveguide 32 that is generally similar in design and construction to the waveguide 12 of FIG. 1, but possibly different in dimensions. The switch 30 further includes a plurality of spaced apart channels, such as two central channels 36, 41, and eight side or lateral channels 34, 35, 37, 38, 39, 40, 42, 43. The central channels 36, 41 are generally similar in design, construction and dimensions to the central channels 14, 17 of switch 10. The lateral channels 34, 35, 37, 38, 39, 40, 42, 43 are generally similar to the lateral channels 15, 16 or 15A, 16A shown in FIG. 1.

Two lateral channels 34, 35 are disposed on one side of the central channel 36. Two other lateral channels 37, 38 are disposed on the other side of the central channel 36. Similarly, two lateral channels 39, 40 are disposed on one side of the central channel 41, while two other channels 42, 43 are disposed on the other side of the central channel 41.

While FIGS. 2 and 3 illustrate the lateral channels 34, 35, 37, 38, 39, 40, 42, 43 as being symmetrically disposed relative to the central channels 26, 41, it should be understood that variations in the separations of these lateral channels relative to each other and to the central channels 36, 41 are also covered by the present invention.

A purpose of the switch 30 is to present different collision—travel paths for the light bullets 20, 21. For instance, assume that in one particular application the light bullet 20 needs to be switched among five different channels 39 through 43, then, by controlling the intensity of the light bullet 21 and its axial displacement relative to the light bullet 21, it would be possible to cause the light bullet 20 to be deflected and to exit into any of the channels 39 through 43. If the light bullet 21 were not injected into the central or input channel 17, then the light bullet 20 will not be deflected, and it will exit the switch 30 through the central channel 41.

For instance, FIG. 2 illustrates the light bullet 21 as being axially displaced above the light bullet 20. In this manner, as the counter-propagating light bullets 20, 21 collide and attract each other, the light bullet 20 is deflected upward into either of the lateral channels 39 or 40. If the intensity of the light bullet 21 is sufficiently high, or is increased, then it will cause the light bullet 20 to be deflected into the upper lateral channel 39. On the other hand, if the intensity of the light bullet 21 is relatively low, or is decreased, then the light bullet 20 is deflected into the lower lateral channel 40.

FIG. 3 illustrates a similar process as that described above in connection with FIG. 2, with the exception that the light bullet 21 is axially displaced below the light bullet 20. In this manner, as the counter-propagating light bullets 20, 21 collide and attract each other, the light bullet 20 is deflected downward into either of the lateral channels 42 or 43. If the intensity of the light bullet 21 is sufficiently high, or is increased, then it will cause the light bullet 20 to be deflected into the lateral channel 43. On the other hand, if the intensity of the light bullet 21 is relatively low, or is decreased, then the light bullet 20 is deflected into the lateral channel 42.

As such, by controlling the position and intensity of the light bullet 21, it is possible to control the switching level or mode of the light bullet 20, thus realizing a multi-level switch 30. In this switch 30, the light bullet 20 may represent the data signals to be switched while the light bullet 21 may represent the control signal that activates the switching.

While only ten channels 34 through 43 are shown in FIGS. 2 and 3, as being positioned along two opposite sides of the waveguide 32, for illustration purpose only, it should be understood that a different number of channels may be selected and positioned along the remaining sides of the waveguide 32.

FIG. 2 illustrates yet an alternative switching arrangement for the switch 30, whereby the light bullet 20 is injected into the central channel 36 and a counter-propagating light bullet 44 is injected into the lateral channel 42. Both light bullets 20, 21 are angularly directed at each other, with a slight angle in their travel paths. This change in direction will allow the light bullet 44 to be injected from a lateral channel such as the lateral channel 42, rather than from the central channel 41.

In yet another embodiment of the switches 10, 30, and still referring to FIGS. 1 through 3 for illustration, the light bullets may be injected, either simultaneously or serially, into one or more of the central and/or the lateral channels (referred to as the input channels) for selective deflection or switching into selected lateral channels (referred to as the exit or output channels).

Figure 4:
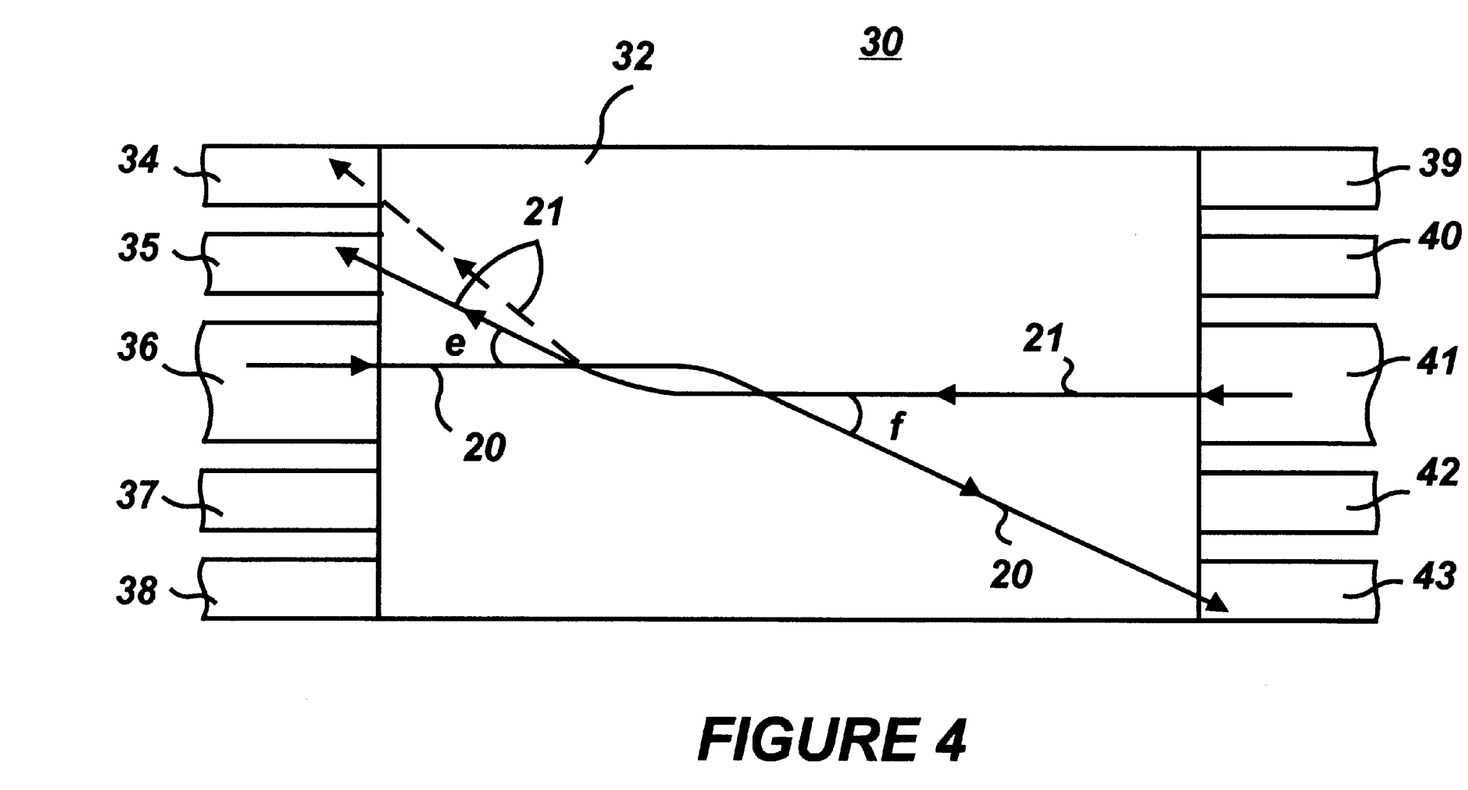
FIG. 4 is a schematic top plan view of the multi-channel switching device of FIGS. 2 and 3, showing yet two possible additional switching paths.

Still another embodiment of the switches 10, 30, is illustrated in FIG. 4, wherein the light bullets 20, 21 do not necessarily meet around the center of the waveguide 32, and wherein each light bullet is selectively switched to a predetermined exit channels. This selective switching may be achieved by regulating the intensity of each light bullet and the timing of the inter-light bullet collision, so as to cause the light bullets 20, 21 to deflect along predetermined travel paths. In this particular example, the collision occurs closer to the central channel 36 than to the central channel 41, and presuming that the intensities of the light bullets 20, 21 are about the same, the deflection angles "e" and "f" of the light bullets 21 and 20, respectively, are about equal, so that the light bullet 21 is deflected into the exit channel 35, while the light bullet 20 is deflected into the exit channel 43. In this example, the intensities of the light bullet 20 could be increased so as to attract the light bullet 21 further upon collision, thus causing it to be injected into the exit channel 34, with its corresponding travel path 46 being shown in dashed lines.

While specific embodiments of the photonic switching devices using light bullets have been illustrated and described in accordance with the present invention, modifications and changes of the apparatus, parameters, and composition, use and operation will become apparent to those skilled in the art, without departing from the scope of the invention. For example, various pulse shapes, sizes and intensities, and alternative highly nonlinear materials may be used.

While the foregoing photonic switches were described herein as using counter-propagating light bullets, it should be understood that light bullets will interact with each other at all angles of approach from co-propagating to counter-propagating. One advantage of co-propagating light bullets is that the interaction time is maximized and is greater than that for counter-propagating light bullets. However, the relative phase of co-propagating light bullets will effect the outcome of their interaction. Nevertheless, for some applications, it may be advantageous to use co-propagating light bullets. In fact, the optimum angle of approach may depend on the application. So, other embodiments of the photonic switches would have entrance and exit channels positioned around the waveguide 12 in FIG. 1, so as to allow for arbitrary directions of approach and departure of the two or more light bullets.

What is claimed is:

1. A multi-channel, ultra-fast, all-optical switch using light bullets as optical pulses, and comprising in combination:

a waveguide;

a plurality of channels extending from said waveguide to provide input and output travel paths for the light bullets;

said waveguide and said plurality of channels being made from a semiconductor material having a sufficiently negative group velocity dispersion and high nonlinear index of refraction to support the light bullets; and the light bullets counter-propagating through, and interacting within said waveguide to selectively change each others' directions of propagation into predetermined channels.

2. The switch according to claim 1, wherein said semiconductor material includes semiconductor crystals.

3. The switch according to claim 2, wherein said semiconductor material is composed essentially of Gallium Arsenide (GaAs).

4. The switch according to claim 3, wherein said semiconductor material has a nonlinear index of refraction ($n_2$) of about $1.7 \times 10^{-13}$ cm$^2$/W.

5. The switch according to claim 3 wherein light propagating through said semiconductor material and having a wavelength of about 7.85 μm gives a group velocity dispersion of approximately −220 psec$^2$/km.

6. The switch according to claim 2, wherein said semiconductor material is composed essentially of Indium Phosphide (InP).

7. The switch according to claim 6, wherein said semiconductor material has a nonlinear index of refraction ($n_2$) of about $2.4 \times 10^{-13}$ cm$^2$/W.

8. The switch according to claim 6 wherein light propagating through said semiconductor material and having a wavelength of about 6.35 μm gives a group velocity dispersion of approximately −220 psec$^2$/km.

9. The switch according to claim 2, wherein said semiconductor material is composed essentially of Gallium Nitride (GaN).

10. The switch according to claim 9 wherein light propagating through said semiconductor material and having a wavelength of about 2.97 microns gives a group velocity dispersion of approximately −220 psec$^2$/km.

11. The switch according to claim 1, wherein said semiconductor material includes multiple quantum well semiconductor material.

12. The switch according to claim 11, wherein said multiple quantum well semiconductor material is composed essentially of Aluminum-Indium-Arsenide/Gallium-Indium-Arsenide.

13. The switch according to claim 11, wherein said multiple quantum well semiconductor material is composed essentially of Gallium Arsenide/Aluminum-Gallium-Arsenide.

14. The switch according to claim 11, wherein said multiple quantum well semiconductor material is composed essentially of Gallium Nitride/Aluminum-Gallium-Nitride.

15. The switch according to claim 11, wherein, at a predetermined wavelength, said multiple quantum well semiconductor material has a nonlinear index of refraction ($n_2$) ranging between about $10^{-9}$ cm$^2$/W and $10^{-7}$ cm$^2$/W.

16. The switch according to claim 5, wherein said predetermined wavelength is approximately 10.5 microns.

17. The switch according to claim 1, wherein said waveguide includes a single planar, rectangularly shaped slab of semiconductor material.

18. The switch according to claim 1 wherein the counter-propagating light bullets are axially displaced relative to each other, in the transverse direction, by approximately the spatial width of a single light bullet.

19. The switch according to claim 1, wherein the light bullets have spatial width; and wherein the dimensions of said plurality of channels and said waveguide are determined by the spatial width of the light bullets and the interaction of two counter-propagating light bullets.

20. The switch according to claim 19, wherein the spatial width of the light bullets is approximately 10 microns.

21. The switch according to claim 1, wherein said plurality of channels include:

two central channels that are oppositely disposed relative to said waveguide, for guiding the light bullets along predetermined propagation paths into and out of said waveguide; and at least two lateral channels that are disposed on either side of said waveguide in a generally symmetrical relation, for guiding the light bullets out of said waveguide.

22. The switch according to claim 21, wherein each central channel has a width of approximately 25 μm; and each of said lateral channels has a width of approximately 20 μm, and is separated from an adjacent central channel by a distance of approximately 15 μm.

23. The switch according to claim 21, wherein at least a first light bullet is injected into one of said central channels, and at least a second counter-propagating light bullet is injected into a lateral channel and is angularly directed at said first light bullet.

24. The switch according to claim 21, wherein the light bullets are injected simultaneously into one or more of said central and lateral channels.

25. The switch according to claim 1, wherein the counter-propagating light bullets define a deflection angle between their changed directions of propagation depending on their interaction; and wherein said deflection angle determines a length dimension of said waveguide.

26. The switch according to claim 25, wherein said deflection angle is approximately ½° (one half of one degree).

27. The switch according to claim 1, wherein said waveguide is made from bulk material for providing the light bullets with other directions of propagation, including directions of propagation out of the plane of said waveguide.

28. The switch according to claim 1, wherein the light bullets propagate along corresponding travel paths; and wherein said travel paths are selectively determined by controlling the timing, intensity, and the axial displacement of the light bullets relative to each other.

29. The switch according to claim 1, wherein the plurality of chancels channels are positioned around the waveguide so as to allow for arbitrary directions of approach and departure of the light bullets.

30. A method of switching by using light bullets as optical pulses, comprising the step of:

defining a waveguide and a plurality of channels extending from said waveguide to provide input and output travel paths for the light bullets, said waveguide and said plurality of channels being made from a semiconductor material, wherein the light bullets counter-propagate through, and interact within said waveguide to selectively change each others' directions of propagation into predetermined channels.

31. A method for making a multi-channel, optical switch using light bullets as optical pulses, comprising the steps of:

forming a waveguide; and forming a plurality of channels extending from said waveguide to provide input and output travel paths for the light bullets, said waveguide and said plurality of channels being made from a semiconductor material, in order to allow the light bullets to counter-propagate through, and interact within said waveguide to selectively change each others' directions of propagation into predetermined channels.

32. A multi-channel, ultra-fast, all-optical switch using light bullets as optical pulses, and comprising in combination:

a waveguide;

a plurality of channels extending from said waveguide to provide input and output travel paths for the light bullets;

said waveguide and said plurality of channels being made from a semiconductor material having a sufficiently negative group velocity dispersion and high nonlinear index of refraction to support the light bullets; and the light bullets co-propagating through, and interacting within said waveguide to selectively change each others' directions of propagation into predetermined channels.

33. A multi-channel, ultra-fast, all-optical switch using light bullets as optical pulses, and comprising in combination:

a waveguide;

a plurality of channels extending from said waveguide to provide input and output travel paths for the light bullets;

said waveguide and said plurality of channels being made from a semiconductor material having a sufficiently negative group velocity dispersion and high nonlinear index of refraction to support the light bullets; and the light bullets propagating at an angle with respect to each other, propagate through, and interact within said waveguide to selectively change each others' directions of propagation into exit channels positioned around said waveguide.

* * * * *